G. D. WINTERS.
ANTISKID DEVICE.
APPLICATION FILED AUG. 9, 1920.
1,422,646.
Patented July 11, 1922.
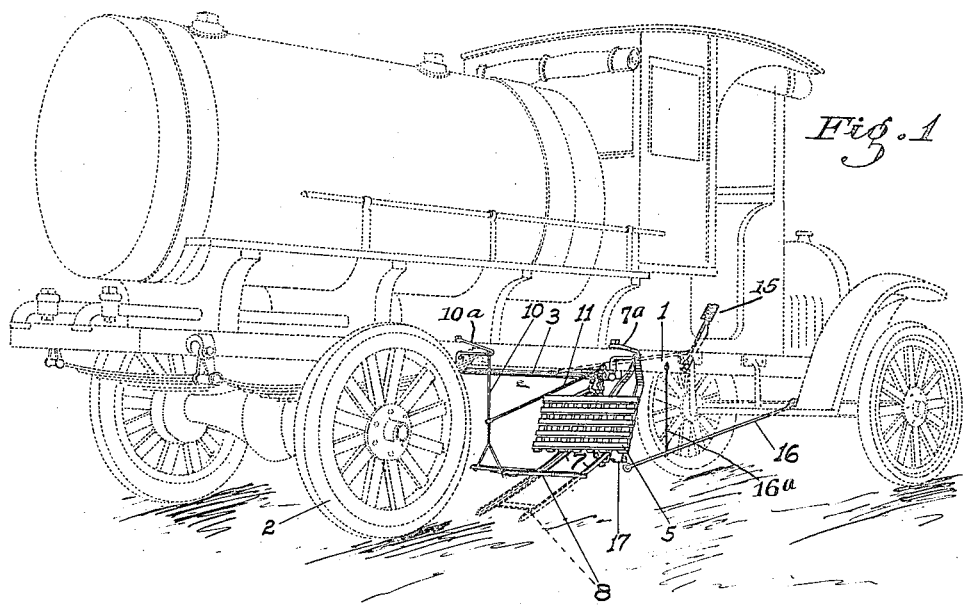
Fig. 1
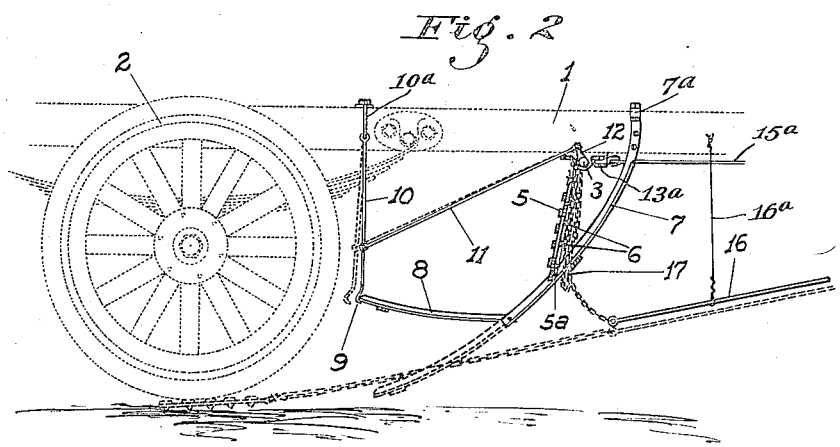
Fig. 2
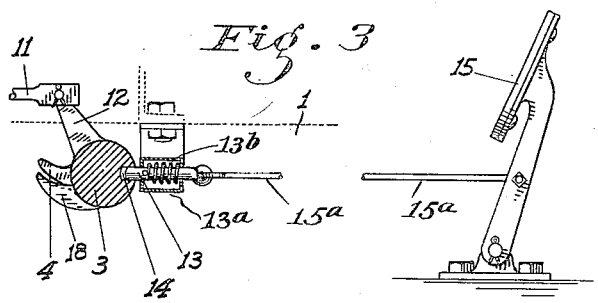
Fig. 3
INVENTOR.
George D. Winters
BY
ATTORNEY

UNITED STATES PATENT OFFICE.

GEORGE D. WINTERS, OF SANGER, CALIFORNIA.

ANTISKID DEVICE.

1,422,646.  Specification of Letters Patent.  Patented July 11, 1922.

Application filed August 9, 1920. Serial No. 402,403.

*To all whom it may concern:*

Be it known that I, GEORGE D. WINTERS, a citizen of the United States, residing at Sanger, county of Fresno, State of California, have invented certain new and useful Improvements in Antiskid Devices; and I do declare the following to be a full, clear, and exact description thereof, reference being had to the characters of reference marked thereon, which form a part of this application.

This invention relates to improvements in anti-skid devices for motor vehicles, the principal object being to provide a device for the purpose, which may be mounted to the frame of the vehicle and which, when put in operation in time of need will positively lock the rear wheels to the ground when the latter start to skid.

With this device therefore, the action of which is controlled by the driver, the danger of the rear end slewing around and possibly striking an obstruction at the side of the road, or another car, is obviated, and the liability to injury both to the vehicle and the occupants thereof, such as frequently happens when cars skid on wet roads, and which appears to be unavoidable even with the use of "non-skid" tires and similar preventatives.

A further object of the invention is to produce a simple and inexpensive device and yet one which will be exceedingly effective for the purposes for which it is designed. These objects I accomplish by means of such structure and relative arrangement of parts as will fully appear by a perusal of the following specification and claims.

In the drawings similar characters of reference indicate corresponding parts in the several views.

Fig. 1 is a perspective view of the device as attached to a motor-truck, though it is of course adaptable for application to other forms of motor vehicle.

Fig. 2 is an enlarged side elevation of the device.

Fig. 3 is an enlarged detail of a shaft locking and releasing means.

Referring now more particularly to the character of references on the drawings, the numeral 1 denotes the frame of the vehicle, and 2 the rear wheels thereof, which are as usual those which are driven.

My device consists of two separate units, each one of which is arranged to co-operate with a corresponding rear wheel and which are controlled by a single common means, the construction being as follows: Journaled on the frame 1 forward of the rear wheels is a transverse shaft 3 adjacent each end of which and normally extending rearwardly therefrom in a substantially horizontal plane are lugs 4 on which loosely hang mats or aprons 5 preferably constructed of criss-crossed strap irons and having teeth 6 projecting therefrom on that side which in operation bears on the ground. The lower end of each mat normally rests lightly and at a rearward angle, on a guide chute 7 comprising a pair of spaced members suitably curved in a vertical plane and rigidly fixed as by a brace or support 7ª to the frame 1, being merely of a strength sufficient to carry the weight of the mat, which is not excessive. To the lower end of the fixed guide structure is hinged another pair of guide members 8, which are adapted to be raised a certain distance so as to be normally some distance from the ground and which when in their lowered position curve toward the point of tangency of the corresponding wheel 2 with the ground but of course terminate somewhat short of such point while being then close to the ground.

Each hinged portion 8 is normally held in raised position by means of hooks 9 on the lower end of a rod 10, which hooks are attached to the frame by a brace or support 10ª as shown, and lightly engage the lower ends of the member 8. The rod 10 is flexibly connected to the frame 1 and has a link 11 connected thereto which extends to an arm 12 projecting from the shaft 3.

The shaft 3 is normally held in position so that the lugs 4 are substantially horizontal by means of a catch or plunger 13, slidably mounted in a housing 13ª fixed to the frame 1, there being a spring 13ᵇ about the plunger and inside the housing acting to force the plunger toward the shaft 3. This catch engages a socket 14 in said shaft, the catch being arranged to be pulled and disengaged from the shaft by a pedal 15 or similar means within reach of the driver of the vehicle, there being a connecting rod 15ª or similar member between said pedal and the catch.

Rods 16 extend from the center of the front axle of the vehicle, to which they are fixed, to a point adjacent the mats, from which point chains 17 connect the same with the mats, the chains having sufficient slack to enable the mats to move under the wheels 2 when released, but no further. These rods are supported near their junction with the chains by means of wires 16ª or similar members depending from the frame 1 and connected to said rods.

The slack portion of the chains is normally held suspended from the ground by means of lugs or hooks 18 on the shaft 3 alongside the lugs 4 and having substantially the same alinement, the chains being caught in as many loops as necessary, and engaged by these hooks, as shown in Fig. 2.

The chains are connected to the mats by means of any readily detachable members, so that they may be quickly unfastened when it is desired to run the wheels off the mats after using.

The chains and rods must of course have sufficient strength to withstand the tensional strain put thereon when the mats engage with the ground and the wheels climb thereon.

The operation of the device is as follows:—When the rear wheels skid to one side or the other, the driver will of course realize this fact and will press the pedal 15, at the same time throwing out the engine clutch. This leaves the shaft 3 free to turn, and the weight of the mats hanging on the lugs 4 will cause the shaft to rotate till the mats drop off the lugs and onto the guides. At the same time the rotation of the shaft causes the link 11 to move and throw the hooks 9 out of engagement with the hinged guides, so that the latter drops down to form a continuous curve. The mats then slide down the guides, being kept in place by longitudinal bars or ribs 5ª which engage the sides of the guides. The weight of the mats is of course sufficient that their passage from their topmost position to the ground will occupy but a small fraction of the time, and will come to rest on the ground when the slack of the chains is taken up, which as stated, permits the wheels 2 to climb and ride thereon.

The lugs 18 of course also turn with the shaft 3, allowing the slack chain to slide off the same, so that the entire length of the chain is free to extend as required.

Thus the wheels will be practically lifted from the ground and there will be interposed therebetween a positive friction surface which supports the wheel and positively will not slip sideways. Forward movement of the vehicle will continue under these conditions only until the frictional drag of the mats on the ground overcomes the momentum of the car. To reposition the device, the wheels are backed off the mats, and the latter hung on the lugs, the shaft 3 being turned to be engaged by the spring catch. The hinged guide members are then raised and engaged by the hooks 9.

From the foregoing description, it will be readily seen that I have produced such a device as substantially fulfills the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. An anti-skid attachment for vehicles comprising a mat normally and releasably hung from the frame of the vehicle clear of the ground on each side thereof, guides fixed to the frames under each mat and projecting downwardly in the plane of the wheels, hinged extensions on the lower ends of the guides, said guides and extensions when in alinement projecting toward the point of contact of the wheels with the ground, but the extensions being normally raised out of such alinement, and means whereby when the mat is released the extensions will be simultaneously released to move in alinement with the guides.

2. An anti-skid attachment for vehicles comprising a mat normally and releasably hung from the frame of the vehicle clear of the ground on each side thereof, guides fixed to the frames under each mat and projecting downwardly in the plane of the wheels, hinged extensions on the lower ends of the guides, said guides and extensions when in alinement projecting toward the point of contact of the wheels with the ground, hook-rods normally engaging the lower ends of the extensions to hold them up out of such alinement, a transverse shaft mounted on the frame, and normally held against rotation, lugs on the shaft supporting the weight of the mat whereby when the shaft is released such weight will cause the same to turn, arms on the shaft, links extending from the arms to the hook-rods, whereby when the shaft is turned the hooks will be moved out of engagement with the extensions.

3. An anti-skid attachment for vehicles comprising a mat normally and releasably hung from the frame of the vehicle clear of the ground on each side thereof, guides fixed to the frames under each mat and projecting downwardly in the plane of the wheels, hinged extensions on the lower ends of the guides, said guides and extensions when in alinement projecting toward the point of contact of the wheels with the ground, but the extensions being normally raised out of such alinement, and a means actuated in common for releasing the mat and simultaneously releasing the extensions to allow them to lie in alinement with the guides.

4. An anti-skid attachment for motor vehicles comprising a mat arranged in the plane of the driven wheels and forward of the same, a transverse shaft fixed to the frame of the vehicle and normally held against turning, lugs extending rearwardly from the shaft and fixed thereto and on which the mats are hung in a substantially vertical plane, means for releasing the shaft whereby it is free to turn, the weight of the mat causing such turning to take place and the mats then dropping from the lugs.

5. An anti-skid attachment for motor vehicles comprising a mat normally hung vertically from the frame of the vehicle and clear of the ground on each side thereof, and fixed guides under each mat projecting toward the point of contact of the wheels with the ground, and adapted to receive and guide the mat into the path of the wheels.

6. An anti-skid attachment for motor vehicles comprising a mat normally hung from the frame of the vehicle and clear of the ground on each side thereof, guides fixed to the frames under each mat and projecting downwardly in the plane of the wheels, hinged extensions on the lower ends of the guides, said guides and extensions when in alinement projecting toward the point of tangency of the wheels with the ground, means for normally holding such extensions in a raised position, and means whereby the extensions will be automatically released to drop into alinement with the fixed guides with the rotation of the shaft.

In testimony whereof I affix my signature.

GEORGE D. WINTERS.